United States Patent [19]

Saari

[11] Patent Number: 4,731,590
[45] Date of Patent: Mar. 15, 1988

[54] CIRCUITS WITH MULTIPLE CONTROLLED GAIN ELEMENTS

[75] Inventor: Veikko R. Saari, Spring Lake Heights, N.J.

[73] Assignee: American Telephone and Telegraph Company, AT&T Bell Laboratories, Murray Hill, N.J.

[21] Appl. No.: 881,895

[22] Filed: Jul. 3, 1986

[51] Int. Cl.⁴ .............................................. H03G 3/10
[52] U.S. Cl. .................... 330/278; 330/285
[58] Field of Search ............... 330/107, 109, 278, 279, 330/285, 304, 253, 254

[56] References Cited

U.S. PATENT DOCUMENTS

| | | | |
|---|---|---|---|
| 3,652,952 | 3/1972 | Chen | 330/57 |
| 3,824,501 | 7/1974 | Harris | 333/18 |
| 4,360,787 | 11/1982 | Galpin | 330/279 |
| 4,455,535 | 6/1984 | Sugawara | 330/278 |
| 4,606,043 | 8/1986 | Aprille et al. | 375/12 |

Primary Examiner—Gene Wan
Attorney, Agent, or Firm—Volker R. Ulbrich; Thomas Stafford

[57] ABSTRACT

An automatic cable equalizer (10) is implemented in CMOS technology with a reduced requirement for off-chip components. A continuously-variable gain control resistor (28) of an AGC circuit (12) in a gain section and two additional continuously-variable gain control resistors (76, 82) in a shaping section (16) of the equalizer are driven by monotonically related control voltages ($V_{H1}$, $V_{H2}$, $V_{L1}$, $V_{L2}$) which are derived from a single feedback loop section (16) by the use of an inverter (102) and a pair of inverters with voltage offset (104, 105). An arrangement is disclosed for realizing a detector (96) and a filter (98) of the gain control feedback section. Another arrangement (134) is disclosed for realizing the inverter (102) and the inverters with voltage offset (104, 105). A third arrangement (154) is disclosed for realizing gain control resistor networks which include the gain control resistors.

5 Claims, 5 Drawing Figures

CIRCUITS WITH MULTIPLE CONTROLLED GAIN ELEMENTS

TECHNICAL FIELD

The invention relates to transistor circuits with two or more gain elements which are controlled by feedback of a measure of the output signal amplitude.

BACKGROUND OF THE INVENTION

In some electronic equipment it is necessary to have different feedback control characteristics for the gain control elements of two or more automatic gain control (AGC) circuits. One example of such equipment is an extended range automatic cable equalizer. Such equalizers are usually constructed with two gain control stages connected in tandem. This is necessary because the gain range of JFET (junction field-effect transistor) devices, which are typically used as variable resistance gain control elements in AGC circuits of the the gain stages, have inadequate range over which they are reasonably linear. Such tandem stage arrangements are described, for example, in U.S. Pat. No. 3,824,501 issued July 16, 1974 to C. A. Harris, in U.S. Pat. No. 3,652,952 issued Mar. 28, 1972 to W. Chen, and in pending application Ser. No. 658,773 by T. J. Aprille et al., now U.S. Pat. No. 4,606,043, all of which are assigned to the same assignee as is the present invention.

One problem with present equalizers is that the JFET variable resistance control elements of the AGC circuits are not readily integratable in a single chip with the other active circuit devices, since they require different processing steps during manufacture. Their provision as discrete off-chip devices significantly increases the size and cost of the equalizer and also degrades the precision of the equalization because of reduced correlation between gain-determining parameters.

Another problem with present equalizers is that, even if all the active devices were integrated, there would be a need for connection of a relatively large number of off-chip capacitors which are too large in value to be readily integrated on the circuit chip. The connection of these capacitors requires the circuit chip to be packaged with a larger number of connection pins, thereby also contributing to the size, complexity, and cost of the equalizer.

SUMMARY OF THE INVENTION

The novel apparatus in accordance with the present invention is an integratable circuit which may be readily realized in CMOS technology and has two or more variable gain circuits, each including a variable resistance gain control element in the form of a MOSFET (metal-oxide-semiconductor field-effect transistor). MOSFETs of both conductivity type conduction channels are used to gain linearity advantages. Feedback control voltages are applied to the MOSFETs according to a scheme which enables control of all of the variable gain circuits with a single control loop.

DETAILED DESCRIPTION

In a gain control circuit in accordance with the present invention, the variable resistance elements may be controlled by control signals derived from a single feedback loop. Although the loop includes only a single output-level detector and a single low-pass filter having capacitors of large value within the control network, it nevertheless can be capable of generating the appropriate control signals for changing the gains of the variable resistance gain control elements in an orderly way; that is, allowing only one gain section to vary within a given part of the signal amplitude range. This separation of control action can be determined by appropriate level shifts and inversions of the basic control voltage and by appropriate choices of control voltages applied to P-channel and N-channel transistors, respectively. The need for only a single feedback control loop permits a reduction in the number of off-chip capacitors and thereby reduces the size, complexity, and cost of the circuit.

Figure 1:
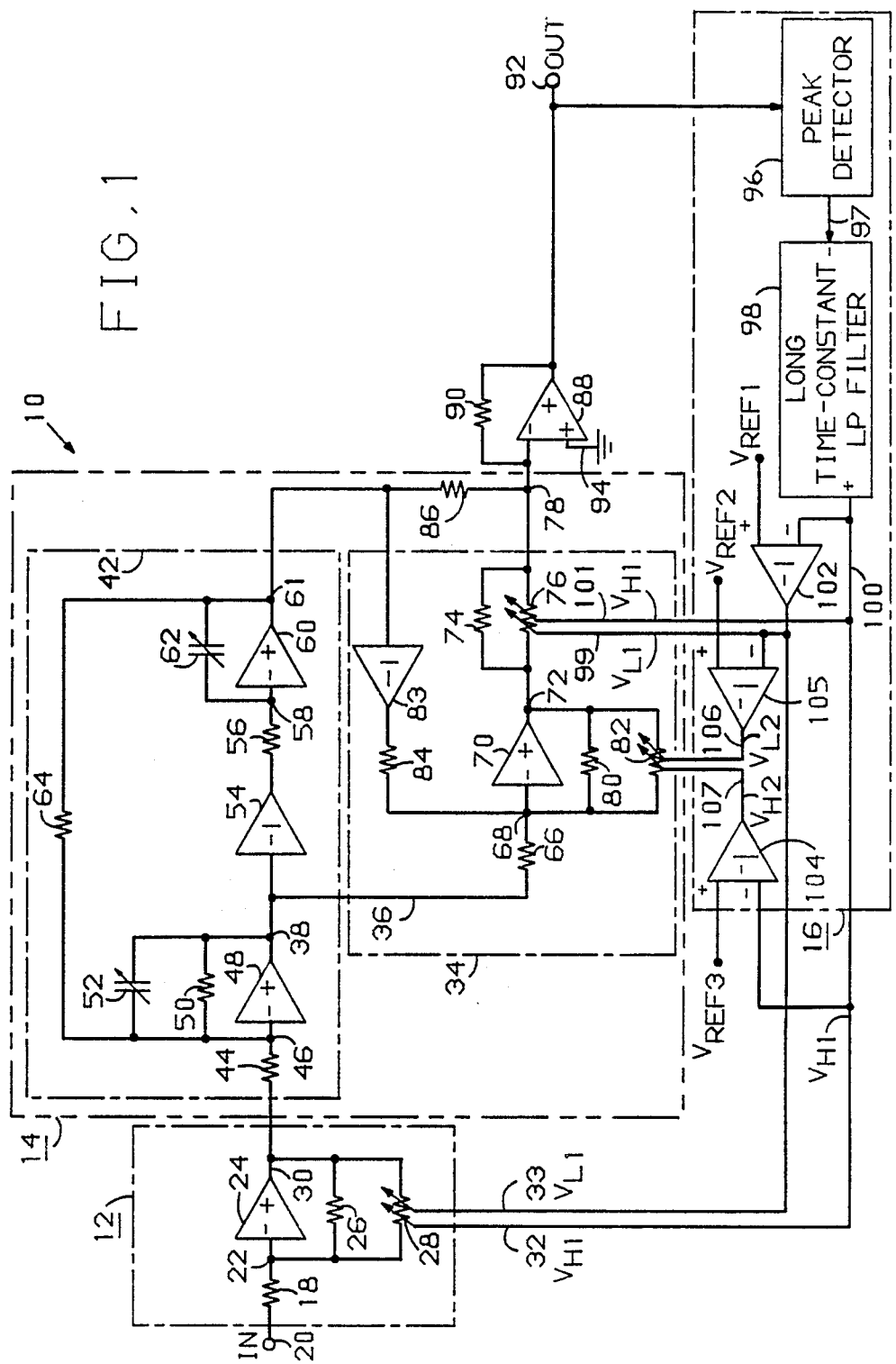
FIG. 1 of the drawings is a schematic circuit diagram, partially in block form, of an automatic cable equalizer in accordance with a preferred embodiment of the invention.

One example of an apparatus in accordance with the invention is the automatic equalizer circuit 10 of FIG. 1. The circuit 10 includes a controlled flat gain section 12 connected in tandem with a controlled shaping section 14. Both sections 12,14 have their gain controlled by a feedback control loop section 16. It is a complementary (CMOS) implementation in which all transistors are enhancement mode MOS devices. The general topology of the circuit 10 as shown in the FIG. 1 is single-ended, or "unbalanced". For use with frequencies at or above the top of the audio range, however, it is preferable that the circuit be designed in a balanced form. The conversion of an unbalanced circuit to a balanced form is within the capabilities of those skilled in the art. Therefore, in the interest of minimizing the complexity of the circuit 10, it is not shown in a balanced form in its entirety. However, balanced configurations of certain elements of the circuit 10 are particularly advantageous and form part of the present invention. These are separately shown in the drawings and described in detail later. Since these elements to be described later pertain to certain control voltages, the control voltages are shown in pairs in the circuit 10 of FIG. 1 in order to make them consistent with the requirements of balanced circuits for pairs of control voltages.

The circuit may have other filtering (not shown) in the transmission path, and the shaping section 14 may be realized as a switched-capacitor network.

In the gain section 12, which forms a first AGC circuit, one side of a coupling resistor 18 is connected to an input terminal 20. The other side is connected to the inverting input node 22 of an operational amplifier 24, which has a gain control resistor network with both a gain range resistor 26 and a continuously-variable gain control resistor 28 connected in parallel between its input node 22 and its output node 30 and responsive to control voltages $V_{H1}$ and $V_{L1}$ at control nodes 32 and 33, respectively.

In the shaping section 14, a second AGC circuit 34 has its input node 36 connected to the bandpass node 38 of a biquadratic filter, or "biquad", 42. The biquad 42 receives the signal from the output node 30 of the gain section 12 at one side of a coupling resistor 44. The other side of the coupling resistor 44 is connected to the inverting input node 46 of an operational amplifier 48. A local feedback resistor 50 and capacitor 52 are connected in parallel between the input node 46 and an output node of the amplifier 48, which is the bandpass node 38 of the biquad 42. The bandpass node 38 is connected through an inverter 54 and a coupling resistor 56 to the input node 58 of another operational amplifier 60, the output of which is a low-pass node 61 of the biquad 42. A local feedback capacitor 62 is connected between the input node 58 of the amplifier 60 and the low-pass node 61. A feedback resistor 64 is connected between the input node 46 of the amplifier 48 and the low-pass node 61.

The second AGC circuit 34 includes a coupling resistor 66 at the input node 36, leading to the input node 68 of an operational amplifier 70, which has an output node 72. A gain range limit resistor 74 and a continuously-variable gain control resistor 76 are connected mutually in parallel as a gain control resistor network between the output node 72 of the amplifier 70 and a summing node 78 and are responsive to control signals $V_{L1}$ and $V_{H1}$ at the control nodes 99 and 101, respectively. A gain range resistor 80 and a continuously-variable gain control resistor 82 are connected mutually in parallel as a gain control resistor network between the input node 68 and output node 72 of the amplifier 70 and are responsive to the control voltages $V_{H2}$ and $V_{L2}$ at the control nodes 107 and 106, respectively. The low-pass node 61 of the biquad 42 is connected through an inverter 83 and a resistor 84 to the input node 68 of the amplifier 70 and is also connected through a low-frequency-gain-floor resistor 86 to the summing node 78. The summing node 78 is an inverting input node of a summing transimpedance amplifier 88, which has a feedback resistor 90 connected between that input node 78 and an equalizer output node 92. The noninverting input node 94 of the amplifier 88 is grounded or connected to some other reference voltage.

In the control loop section 16, the equalizer output node 92 is connected as an input node of a peak detector 96. The peak detector output node 97 is connected as an input node of a long time-constant low-pass filter 98, which has a phase inversion in the particular case being described. The filter output node 100 carries the control voltage $V_{H1}$ and is connected directly to the control node 101 of the control resistor 76 and to control node 32 of the control resistor 28 of the first AGC circuit 12. It is also connected as the input node of an inverter 102, which has its output $V_{L1}$ connected to the other control node 99 of the control resistor 76, to the control node 33 of the first AGC circuit 12, and to an input node of an inverter with voltage offset 104. The output $V_{L1}$ of the inverter 104 is supplied the control node 107. Another inverter with voltage offset 105 has an input connected to the node 101 and an output $V_{H2}$ connected to a control node 106 of the control resistor 82. The reference voltages applied, respectively, to the positive inputs of the three inverters 102, 104, and 105 can be approximately as follows: $V_{REF1} \approx 0$, $V_{REF2} \approx \frac{1}{2} V_{SS}$ and $V_{REF3} \approx \frac{1}{2} V_{DD}$, where $V_{DD}$ and $V_{SS}$ are the positive and negative supply voltages, respectively.

For understanding the operation of the equalizer circuit 10, it is convenient to initially consider the signal received at the input terminal 20 to be very weak. In that case, both the gain section 12 and shaping section 14 are set at maximum gain, meaning that the continuously-variable gain control resistor 28 of the operational amplifier 24, and the continuously-variable gain control resistor 82 of the operational amplifier 70 are at their maximum resistance values, while the continuously-variable gain control resistor 76 is at its minimum resistance value. These limiting values are obtained as a result of the control voltage $V_{H1}$ at the output node 100 of the control section 16 being at its positive limiting value, as will be explained further below with respect to the interrelationships of the various control voltages and the natures of the resistance elements being controlled.

As the voltage level, i.e., amplitude of the signal at the equalizer output node 92 rises above a threshold voltage of the peak detector 96, the control voltage $V_{H1}$ begins to decrease. The continuously-variable gain control resistor 76 responds with increasing resistance values, with the result that the gain of the equalizer is reduced. The continuously-variable local feedback resistor 82 responds with decreasing resistance values because of the voltage inversion produced by the inverters with offset 104, 105, and this also reduces the gain. The voltage offset designed into the inverters 104, 105 compresses the range of the response of resistor 82 so that the voltage gain of the second AGC circuit 34 is substantially reduced before its current gain is substantially reduced. This order of operating gives the best linearity, i.e. lowest signal distortion.

The gain for the signal via the path from the bandpass node 38 to the summing node 78 is reduced in relation to the signal contributed to the summing node 78 through the resistor 86 from the low-pass node 61. With further signal strength increase, finally, the signal current at the summing node 78 is entirely from the low pass node 61. Virtually at this point, the continuously-variable gain control resistor 28 becomes active for further gain reduction. In this manner the weak signals have their gain automatically adjusted in the shaping section 14, since they require signal shaping, having traveled through long lengths of cable. The stronger signals undergo a simple gain adjustment in the gain section 12. Their strength indicates that they have suffered little attenuation on their transmission route and therefore do not require shaping.

A particularly advantageous feature of the equalizer circuit 10 is that there is only a single feedback control loop to control both the first AGC circuit 12 and the second AGC circuit 34. This eliminates the necessity of a number of relatively large value capacitors by requiring only a single peak detector 96, and a single long time-constant low-pass filter 98, whereas previous arrangements generally required at least two peak detectors and two filters, one of each being associated with each AGC loop. The compass of the single loop automatically undergoes an increase when the incoming signal amplitude rises above a predetermined level. The combination of the simple inverter 102 and the inverters with voltage offset 104 and 105 enables the single basic control voltage $V_{H1}$ to appropriately control the three different continuously-variable gain control resistors 28, 76, and 82 with responses over different parts of the signal range for each one.

Figure 2:
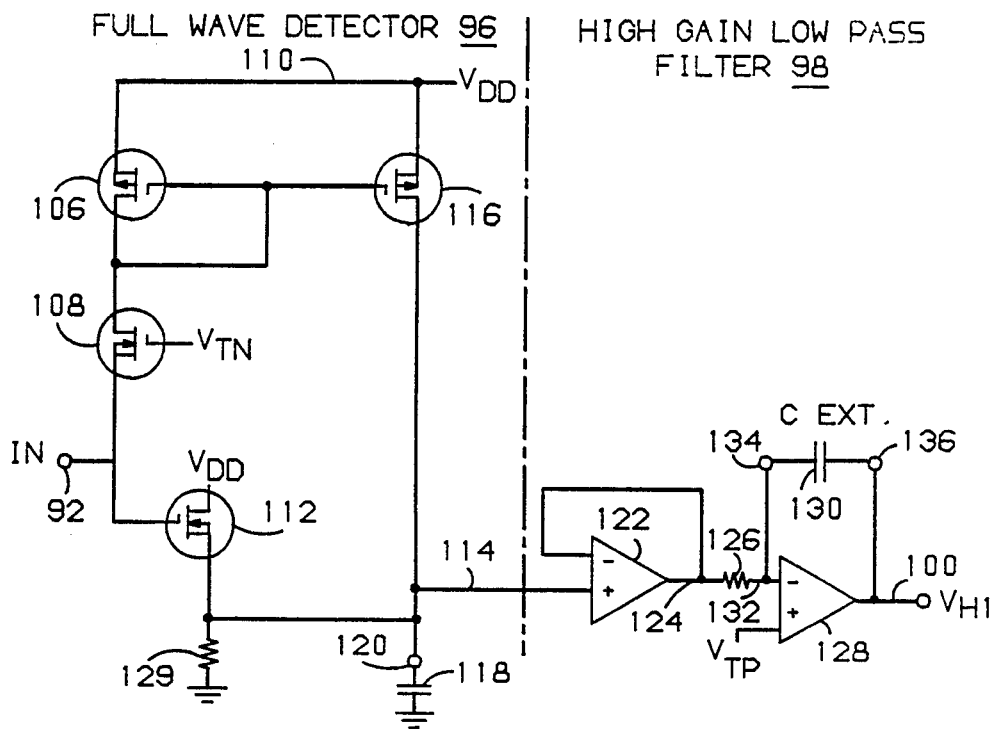
FIG. 2 is a schematic circuit diagram of one example of a peak detector and low-pass filter of the equalizer of FIG. 1.

While the peak detector 96 and the high gain low-pass filter 98 may be known circuits of this general type, a particularly useful arrangement for such circuits is shown in FIG. 2. The input to the full-wave peak detector 96 is from the equalizer output node 92. One signal path to output node 114 includes an N-channel transistor and a P-channel transistor 106, 108 respectively connected in series between the node 92 and a positive supply voltage node $V_{DD}$. That path is completed via a P-channel transistor 116, which has its source connected to the positive supply voltage node 110 and its gate common to the gate and drain of the transistor 106, so that there is formed a current mirror arrangement between transistors 106 and 116, by virtue of which the current fed to the output node 114 will increase monotonically with the voltage at the equalizer output node 92 after the latter drops below a negative threshold determined by the d.c. negative threshold voltage $V_{TN}$ applied to the gate of transistor 108, added to the threshold voltage of transistor 108 itself. Another signal path is produced by an N-channel transistor 112, which has its drain connected to the positive voltage supply node $V_{DD}$ and its source connected to the output node 114. The current fed into node 114 by this transistor 112 increases monotonically with voltage at node 92, after the latter rises above a threshold determined by the d.c. positive threshold voltage $V_{TP}$ applied to the positive input terminal of an integrator 128, added to the threshold voltage of the transistor 112 itself. This, however, is true only after the capacitor 118 has been charged up to the voltage $V_{TP}$ by earlier current bursts which are later moderated by gain-reduction action of the control loop. The relatively large value capacitor 118 is connected with one side at an external pin 120 for the output node 114 and its other side connected to ground potential. A d.c. (direct current) return path to ground is provided by resistor 129. The gate of the transistor 108 is connected to the negative threshold reference voltage $V_{TN}$.

The output node 114 of the detector 96 is connected to the noninverting input node of a buffer amplifier 122, which has its output node 124 connected to an integrator 128. The integrator 128 includes an input resistor 126 and a relatively large external feedback capacitor 130 connected via two terminal pins 134, 136 between an inverting input node 132 at the one pin 134 and the node 100 at the other pin 136. A noninverting input node of the integrator 128 is connected to a positive threshold reference voltage $V_{TP}$, as already stated above.

The applied voltages $V_{TP}$ and $V_{TN}$ add to the threshold voltages of the transistors 112 and 108, respectively, to set the positive and negative detection thresholds. If $V_{TP}$ is approximately equal to the threshold voltage of an N-channel transistor, and $V_{TN}$ is approximately equal to the negative of the threshold voltage of an N-channel transistor with a zero back-gate bias, then the detection thresholds are approximately $+2V_{TN}$ and $-2V_{TN}$, or roughly within a range of $\pm 1.2$ volts in this particular case.

Figure 3:
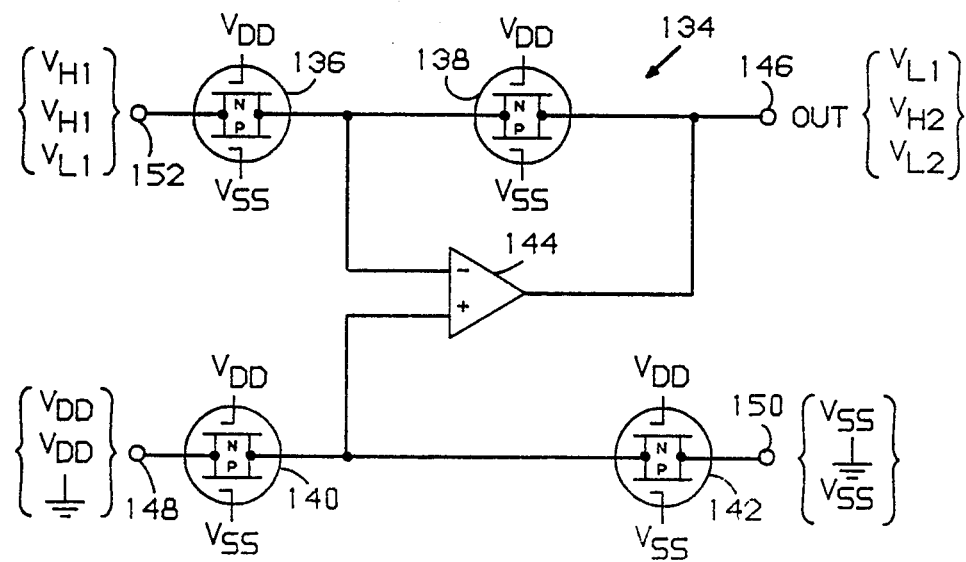
FIG. 3 is a schematic circuit diagram of an arrangement which can serve as a level-shifting inverter in a feedback control loop of the circuit of FIG. 1.

The inverters 102, 104, and 105 are all in the form of the circuit 134 of FIG. 3. There are four resistance elements 136, 138, 140, and 142 in the circuit 134 which are in the form of CMOS transmission gates. That is, each one is made up of a pair of N-channel and P-channel devices with voltages of opposite sign applied to their respective gates. In this case their gates are respectively connected to the positive and negative supply voltage nodes $V_{DD}$, $V_{SS}$. An operational amplifier 144 has an inverting input node connected to the common node of the resistors 136, and 138 and has a noninverting input node connected to the common node of the resistors 140 and 142. The output node 146 of the amplifier 144 is also the output node of the circuit 134 and is connected to the side of the resistor 138 remote from the resistor 136. The circuit 134 has one input terminal 152 which may receive the control voltage $V_{H1}$ from the filter 98 or another control voltage. The circuit also has two reference voltage terminals 148 and 150. Thus, the resistors 140 and 142 form a voltage divider by which there is determined an appropriate input voltage offset applied to the amplifier 144, while the resistors 136 and 138 determine the gain of the amplifier 144. Each of the input terminals 148, 150, 152 is labeled with three voltages, in respective order with three output voltages listed at the output node 146. Thus, if the first-listed voltages are applied to the terminals 148, 150, and 152, the output node will have the voltage $V_{L1}$, and so on. It can be seen that the first-listed combination makes the circuit 134 perform as the inverter 102. The second-listed combination makes the circuit 134 perform as the inverter with voltage offset 104, and the third-listed combination makes it perform as the inverter with voltage offset 105.

One advantageous feature of the present equalizer circuit 10 is that the continuously-variable gain control resistors 28, 76, 82 may be implemented by resistor networks which are all similar CMOS device configurations which will be described in more detail later. Specifically, they are transmission gate arrangements with pairs of MOS devices having different polarity conduction channels connected with common sources and common drains and with oppositely moving gate voltages. This gives the variable resistor networks a relatively linear response. Gains in the equalizer circuit are determined by the scaling of the dimensions of the transistors in the transmission gate structures, as well as by the control voltages and by programming switches that add or remove parallel branches.

Figure 4:
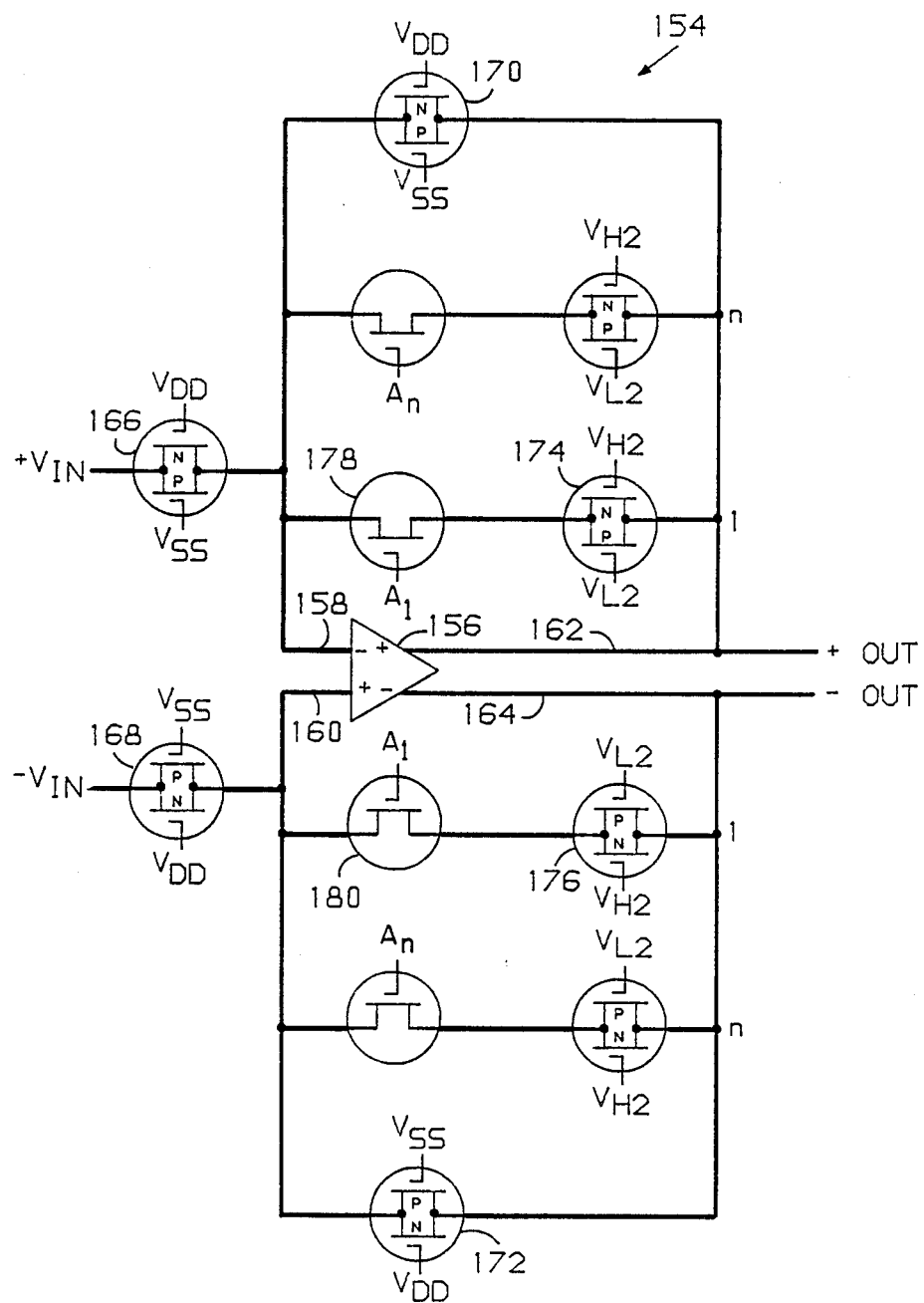
FIG. 4 is a schematic circuit diagram of one example of a continuously-variable gain control resistance network of the circuit of FIG. 1.

The FIG. 4 shows a novel resistor network 154 for serving the function of each of the feedback resistor networks associated with the operational amplifiers 24 and 70 in FIG. 1, which include the continuously-variable gain control resistors 28, 76 and 82. A balanced operational amplifier 156 has an inverting input node 158, a noninverting input node 160, a noninverting output node 162, and an inverting output node 164. The input nodes 158, 160 are connected to input voltages $+V_{IN}$ and $-V_{IN}$ via fixed coupling resistors 166, 168, respectively. The coupling resistors 166, 168 are each a complementary pair of transistors connected in parallel, with the gate connected to a positive voltage supply node $V_{DD}$ for the N-channel transistor, and to a negative supply voltage node $V_{SS}$ for the P-channel transistor. A pair of gain-limiting resistors 170, 172, with similar structures and gate connections, are connected between the respective input and output node 158, 162 and 160, 164. Also connected between the input and output nodes 158, 162 and 160, 164 are respective series combinations of a programming switch transistor 178, 180 and a variable resistor 174, 176. A number n of such series combinations is provided for each side of the amplifier 156. Only the first and the nth one are shown in the drawing. The switch transistors 178, 180 are responsive to logic signals $A_l$, while the variable resistors 174, 176 associated with them are all responsive to a continuously-variable control voltage. Thereby, the range of the gain for a particular mode of operation is set by the set of logic signals represented by $A...A_n$ in that they determine which combination of the variable resistors 174, 176, etc. are connected in parallel between the input 158, 160 and the output 162, 164 of the amplifier 156 on each side.

Figure 5:
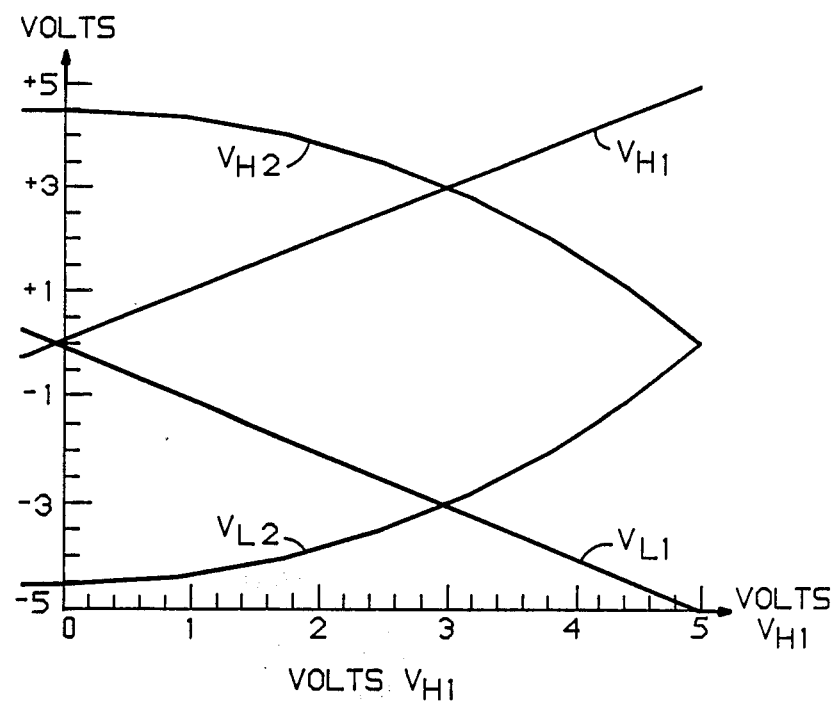
FIG. 5 is a graphical representation of the control voltages generated from the basic control voltage $V_{H1}$ of an example of the equalizer of FIG. 1.

The FIG. 5 is a graph illustrating the relationships of the four control voltages $V_{H1}$, $V_{H2}$, $V_{L1}$, and $V_{L2}$ as a function of basic control voltage $V_{H1}$. From the graph it can be seen with reference to the FIG. 1 that for a weak signal condition for the equalizer 10, $V_{H1}$ is at approximately the positive supply voltage $V_{DD}$ and its complement $V_{L1}$ is at approximately the negative supply voltage $V_{SS}$. This sets the continuously-variable resistor networks at the resistance values for maximum gain. The control voltages $V_{L2}$ and $V_{H2}$ are also at their extreme values, i.e., zero, to also set the resistance for the continuously-variable local feedback resistor 82 in second AGC 34 at maximum value for maximum gain. The control voltages $V_{L1}$ and $V_{H1}$ are also applied to the control resistor 28 in the first AGC circuit 12, but with the roles of the N- and P-channel transistors reversed so that the first and second AGC's are not both responsive in the same half of the range of basic control voltage $V_{H1}$. As the control voltage $V_{H1}$ decreases, the continuously-variable gain resistors 28, 76, and 82 are affected as shown by the relationship of the control voltages in view of their connections as given by FIG. 3. It can be seen that the control voltages are monotonically related. That is, the slope of each of the individual control voltages does not change sign.

In the prior arrangements, there is no precisely defined lower limit on the gain of either section. The control voltages in the two control loops can move much further in the direction of reducing gain than is appropriate for normal maximum signal levels at the inputs. The flat gain amplifier is located in front of the shaping section, and the detectors in each of the control loops are located at the outputs of the respective sections. The loops are completely separate topologically. In the normal operation of the prior arrangement, when the signal level increases to the magnitude that activates the detector at the output of the first section, the flat gain section takes over control of the receiver output level and the characteristic produced by the shaping section changes no further. However, upon severe overload, both sections can be driven far below the normal gain limits; and the circuit will then take relatively long to recover.

In the novel arrangement, the shaping section has well-defined minimum gain limits having no substantial residual shape. The limits are programmed to lower values for increased bit rates to provide the increased ranges of shape equalization needed. Furthermore, the control voltage overload limits substantially correspond to the normal receiver minimum gain conditions. This promotes recovery from overload. When the signal amplitude has risen so as to produce the limit of the range of the shaping section, the control voltages derived from the receiver output continue to move, now more abruptly, until the actuation threshold of the flat gain section is crossed and the proper overall gain of the receiver is reached. Thus, at moderate signal levels the control loop encompasses the shaping section but not the flat gain section. At stronger levels, the flat gain section becomes encompassed, but only after the shaping section has become unresponsive to the control voltages.

It is not absolutely necessary that the flat gain section precede the shaping section in the signal path. However, this is a natural configuration because the flat gain section, having a lower range of gain variation, can be designed to operate with lower distortion. Furthermore, at maximum gain the shaping section filters out much of the noise produced in the flat gain section.

While the above-described example is in the form of an equalizer circuit in which two gain stages are connected in tandem and are different from each other, it will be apparent to those skilled in the art that the invention is not limited to such an arrangement and may be useful for other circuits in which there is a requirement for variable resistances which are controlled with a feedback arrangement. The gain control circuits may also be similar to each other and can conceivably be connected mutually in parallel or in some other configuration to suit whatever particular purpose is desired. In any case, their operations can be separated by the use of variable resistance elements with different control voltage response ranges which are controlled by monotonically related control voltages derived from a single feedback control loop voltage as described above. Further separation possibilities are afforded by the use of inverters and/or level shifters for the control voltage.

What is claimed is:

1. Gain control apparatus having an input node adapted to be supplied with an input signal to be controlled and an output node for yielding an output signal representative of a gain controlled version of the input signal comprising:
    a first gain control circuit including a first continuously controllable variable resistance network having control nodes for controlling the gain of said first gain control circuit;
    a signal shaping section including a second continuously controllable resistance network having second control nodes for controllably varying the amplitude of an applied signal, said shaping section and said first gain control circuit being connected in tandem; and
    a single control-loop definition network means supplied with the output signal from the gain control apparatus output node for generating a first plurality of control signals which are monotonically related and are supplied to said first and second control nodes, said first and second continuously controllable resistance networks being responsive to said first plurality of control signals so that amplitude variation of said input signal is control said second continuously controllable resistance network for input signal amplitude values less than a predetermined value and by said first gain control circuit for input signal amplitude values greater than said predetermined value.

2. The gain control apparatus as defined in claim 1 wherein said signal shaping section further includes a second gain control circuit including a third continuously controllable resistance network having third control nodes for controlling the gain of said second gain control circuit, and wherein said single control-loop definition network means further generates a second plurality of control signals which are monotonically related to said first plurality of control signals and are being supplied to said third control nodes, said second gain control circuit being connected in series with said second continuously controllable resistance network, wherein said third continuously controllable resistance network is responsive to said second plurality of control signals for controlling the gain of said second gain control circuit and in conjunction with said second continuously controllabale resistance network in response to said first plurality of control signals controls variation in said input signal amplitude for input signal amplitude values less than said predetermined value.

3. The gain control apparatus as defined in claim 2 wherein said single control-loop definition network means includes a peak detector supplied with said gain control apparatus output signal for generating a peak signal representative of the amplitude of such output signal, a low-pass filter supplied with said peak signal for generating a smooth version thereof as a filter output signal, a first inverter supplied with said filter output signal for generating a first inverted signal version thereof, said filter output signal and said first inverted signal comprising said first plurality of control signals, a second inverter having first and second inputs and an output, said filter output signal being supplied to said first input of said second inverter and a first predetermined reference potential being supplied to said second input of said second inverter for yielding a level shifted second inverted signal at said second inverter output and a third inverter having a first input, a second input and an output, said first inverted signal being supplied to said first input of said third inverter and a second predetermined reference potential being supplied to said second input of said third inverter for yielding a level shifted third inverted signal at said third inverter output, said second and third inverted signals comprising said second plurality of control signals.

4. Gain control apparatus as defined in claim 3 wherein each of said first and second continuously controllable resistance networks comprises first and second complementary field-effect transistors having their conduction channels connected mutually in parallel and having their gate electrodes connected to be supplied with respective ones of said first plurality of control signals and wherein said third continuously controllable resistance network comprises first and second complementary field-effect transistors having their conduction channels connected mutually in parallel and having their gate electrodes connected to be supplied with respective ones of said second plurality of control signals.

5. The gain control apparatus as defined in claim 4 wherein each of said inverters comprises:
  an operational amplifier having an inverting input, a noninverting input and an output,
  a first fixed resistor connected between said inverting input and said output of said operational amplifier,
  a second fixed resistor connected between said inverting input of said operational amplifier and a first input of said inverter,
  a third fixed resistor connected between a second input of said inverter and said noninverting input of said operational amplifier, said second inverter input being a first reference voltage node, and
  a fourth fixed resistor connected between said noninverting input of said operational amplifier and a second reference voltage node of said inverter,
  each of said fixed resistors comprising first and second complementary field-effect transistors with their conduction channels connected mutually in parallel to form a complementary pair and having their gates respectively connected to first and second reference voltages.

* * * * *

UNITED STATES PATENT AND TRADEMARK OFFICE
CERTIFICATE OF CORRECTION

PATENT NO. : 4,731,590
DATED : March 15, 1988
INVENTOR(S) : Veikko R. Saari

It is certified that error appears in the above-identified patent and that said Letters Patent is hereby corrected as shown below:

Column 3, line 61, "$V_{L1}$" should read --$V_{L2}$--; line 62, after "supplied", insert --to--. Column 8, line 52, "control said" should read --controlled by said--; line 67, delete "being". Column 9, line 14, "such" should read --said--.

Signed and Sealed this

Twentieth Day of December, 1988

*Attest:*

DONALD J. QUIGG

*Attesting Officer*  *Commissioner of Patents and Trademarks*